Sept. 27, 1966

N. L. KENDT 3,275,344

MISALIGNMENT COMPENSATING COUPLING

Filed Feb. 19, 1965

INVENTOR.
NORMAN L. KENDT
BY James E Espe
HIS ATTORNEY

United States Patent Office 3,275,344
Patented Sept. 27, 1966

3,275,344
MISALIGNMENT COMPENSATING COUPLING
Norman L. Kendt, Louisville, Ky., assignor to General Electric Company, a corporation of New York
Filed Feb. 19, 1965, Ser. No. 433,943
1 Claim. (Cl. 285—9)

This invention relates generally to a coupling to interconnect two fluid conduits and, more specifically, to a coupling which compensates for axial and lateral misalignment of the conduits.

The present invention, though not limited in its applicability thereto, is particularly useful in providing a coupling between a stationary conduit disposed within a dishwasher wash chamber and a movable conduit carried by the dishwasher closure member. Such a coupling is required when a top spray source is provided in a top-opening dishwasher as shown, for example, in U.S. Patent 2,987,260, issued to R. M. Sasnett on June 6, 1961, and assigned to the General Electric Company, assignee of the present invention. When a dishwasher such as that shown by Sasnett is produced under mass production conditions, it is not unusual for manufacturing tolerances to create a misalignment between the coupling member carried by the closure member and the coupling member carried by the dishwasher cabinet wall. This misalignment may be either lateral, axial or both. The phrase "axial misalignment" includes both the condition wherein the axes of the two coupling members are co-linear but the terminal ends of the conduits are spaced farther apart or closer together than normal and, also, the condition wherein the axes of the two coupling members are skew or canted relative to each other. Of course, when such misalignment occurs a conventional coupling device may fail to provide a sufficiently water-tight seal or may actually restrict flow through the coupling if the internal fluid passageways are not aligned.

Alignment compensating couplings have been heretofore proposed to solve the above-discussed problem. One such coupling is that described and claimed by W. J. Heerlein in U.S. Patent 3,115,352, issued on December 24, 1963, and assigned to the General Electric Company, assignee of the present invention. Although, the Heerlein device suitably compensates for misalignment, its structural configuration consumes more space than is sometimes desirable. For example, in a top-opening dishwasher there may be provided a movable rack system such as claimed and described by L. W. Guth in U.S. Patent 3,087,769, issued April 30, 1963 and assigned to the General Electric Company, assignee of the present invention. A movable rack like that of Guth may require clearance space between the rack and the dishwasher cabinet wall for the rack to travel an arcuate path up and out of the cabinet. A coupling device similar to that of Heerlein, with its outwardly projecting flanges, may interfere with movement of the rack. Accordingly, it would be desirable to provide a coupling to interconnect two fluid conduits which consumes a minimum space but which still compensates for lateral and axial misalignment of the conduit.

It is an object of this invention to provide an improved coupling to interconnect two relatively movable fluid conduits.

It is another object of this invention to provide a coupling to interconnect two relatively movable fluid conduits which will compensate for axial, lateral or both axial and lateral misalignment of the two conduits.

Briefly stated, in accordance with one aspect of the invention, there is provided a first member which is substantially non-deformable and a second member which is deformable. The deformable member has a tubular portion adapted at one end to be secured to a conduit and has at its opposite or distal end, an inwardly directed deformable flange. The non-deformable member has an engaging surface which is adapted to contact the flange and deform the flange into the configuration of the surface to thereby form a substantially water-tight seal between the two members. The tubular portion, due to its elongated configuration, is capable of flexing both axially and laterally to accommodate misalignment between the two coupling members.

While the specification concludes with a claim particularly pointing out and distinctly claiming the subject matter which is regarded as the invention, it is believed the invention will be better understood from the following description taken in connection with the accompanying drawings in which:

Figure 1:
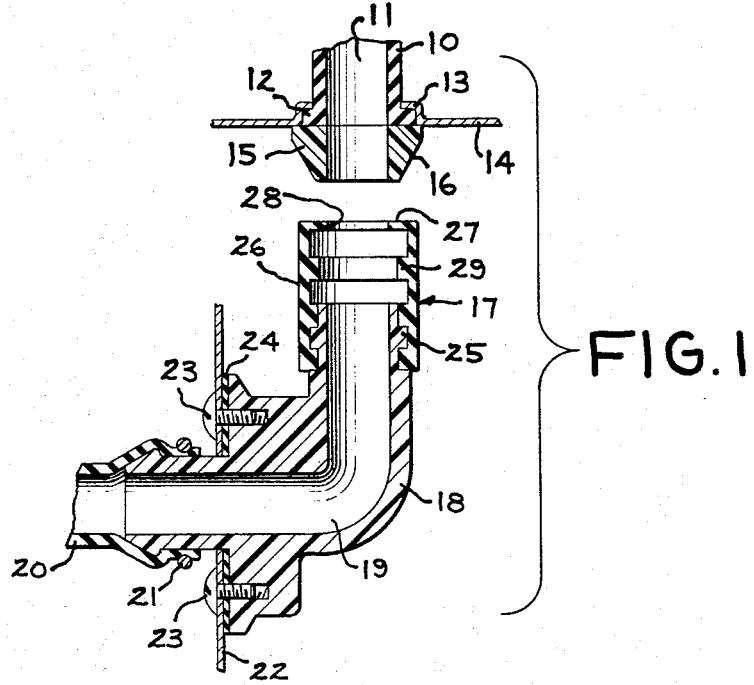
FIGURE 1 is a sectional view of a coupling of the present invention with the individual coupling members separated.

Referring to the drawings, and particularly to FIGURE 1 thereof, there is shown a movable conduit 10 having a fluid passageway 11 therein. Conduit 10 has a flange 12 at its terminal end which cooperates with a raised portion 13 of a movable supporting member 14. Movable supporting member 14 may take the form of the closure member of a top-opening dishwasher. Also secured to supporting member 14 by suitable means (not shown), and in sealing engagement with flange 12, is a coupling member 15. Coupling member 15 is provided with a generally conical engaging surface 16.

Positioned below the movable coupling member 15, is a stationary deformable coupling member 17 secured adjacent one end to a conduit 18. Conduit 18 has therein a fluid passageway 19 which communicates with a hose 20 or the like secured to conduit 18 by means of a clamping ring 21. Conduit 18 is secured to a stationary member 22 by means of screws 23. Member 22 may be the cabinet wall of a dishwasher and, if this is true, a gasket 24 may be provided to prevent wash fluids from escaping through the opening in member 22 through which conduit 18 passes.

Coupling member 17 is secured to conduit 18 by means of an annular boss 25 formed in the outer surface of conduit 18 near the terminal end thereof which cooperates with an annular recess in the inner surface of coupling member 17. Coupling member 17 has a tubular portion 26 which, in the relaxed position, generally aligns itself with the axis of conduit 18. The distal end of tubular portion 26 is provided with an inwardly directed flexible flange 27. Flange 27 has a central opening 28 therethrough which is in substantial alignment with fluid passageway 19 in conduit 18. Also, under ideal conditions, opening 28 is in substantial alignment with fluid passageway 11 in conduit 10.

Figure 2:
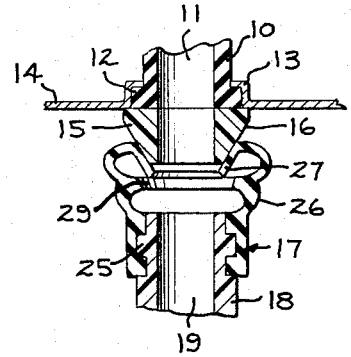
FIGURE 2 is a partial sectional view similar to FIGURE 1 but showing the individual coupling members engaged.

By comparing FIGURE 2 with FIGURE 1, it can be seen that as coupling member 15 moves into engagement with coupling member 17, flange 27 is deformed downwardly at its inner periphery to an extent wherein the outer surface of flange 27 comes into sealing engagement with engaging surface 16. Due to its flexibility, or deformability, coupling member 17 deflects outwardly so that there is an internal cavity within tubular portion 26 external of engaging surface 16 which, if fluid pressure increases within passageway 19, exerts a greater engaging force between surface 16 and flange 27. Therefore, the coupling has an inherent tendency to overcome any excessive leakage which would otherwise be created by a restriction downstream from the coupling.

Figure 4:
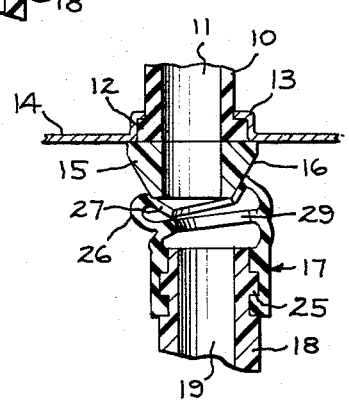
FIGURE 4 is a view similar to FIGURE 2 but showing the individual coupling members laterally misaligned.

Due to the elongation of tubular portion 26, coupling member 17 can suitably provide a substantially water-tight seal even though fluid passageways 11 and 19 are laterally misaligned at least to the extent shown in FIGURE 4. Of course, the coupling device would function with a shorter tubular portion; however, the more elongated that the tubular portion is, the more lateral and axial misalignment the coupling device can compensate for.

Figure 3:
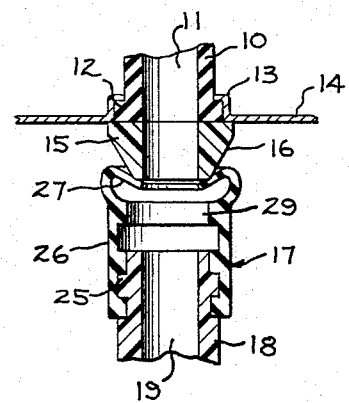
FIGURE 3 is a view similar to FIGURE 2 but showing the individual coupling members axially misaligned.

In the preferred embodiment of the present invention, an annular rib 29 is provided intermediate the terminal end of conduit 18 and the distal end of coupling member 17. Annular rib 29 may be integral with tubular portion 26 and may extend inwardly therefrom to form a central opening therethrough of sufficient size to allow full flow of fluid through coupling member 17. Annular rib 29 provides certain strength characteristics which allow tubular portion 26 to be satisfactorily elongated without collapsing under its own weight. As can be seen in FIGURES 2–4, rib 29 causes tubular portion 26 to assume an inflated configuration by expanding outwardly above and below the rib, when engaging surface 16 is in sealing engagement with flange 27. If desired, tubular portion 26 may be more elongated than shown in the drawing by providing additional ribs 29 axially spaced along the tubular portion.

Thus it can be seen that the present invention provides an effective coupling device to interconnect two relatively movable fluid conduits which compensates for axial and/or lateral misalignment of the conduits.

As will be evident from the foregoing description, certain aspects of the invention are not limited to the particular details of construction of the example illustrated, and it is contemplated that various other modifications or applications will occur to those skilled in the art. For example, it would be within the spirit of the present invention to obviate coupling member 15 by forming conduit 10 into a suitable configuration to function as member 15 is described herein as functioning. It is therefore intended that the appended claim shall cover such modifications and applications as do not depart from the true spirit and scope of the invention.

What I claim as new and desire to secure by Letters Patent of the United States is:

A coupling to provide a substantially fluid-tight seal between two relatively movable fluid-conducting conduits which compensates for axial and lateral misalignment of the conduits comprising:

(a) a first coupling member having an axial bore secured to one of the two conduits and having a generally conical engaging surface;
(b) a second coupling member comprising a flexible elongated tubular portion secured to the other of the two conduits at one end and including:
 (1) a substantially radially inwardly-extending annular flange of greater flexibility than said tubular portion at its other end defining an opening of substantially the same diameter as said bore and adapted to be engaged by said engaging surface as said first and second coupling members are brought together to form a coupling,
 (2) one or more annular ribs on the inner surface of said tubular portion for increasing the resistance to deformation of the parts of the tubular portion immediately adjacent any one of said one or more annular ribs,
 (3) said inwardly-extending annular flange and the parts of said tubular portion not immediately adjacent any one of said one or more annular ribs being readily deformable upon contact by said engaging surface to compensate for axial or lateral misalignment of the two conduits.

References Cited by the Examiner

UNITED STATES PATENTS

| | | | |
|---|---|---|---|
| 1,939,204 | 12/1933 | Conklin | 285—8 |
| 2,238,588 | 4/1941 | Hagopian | 285—8 |
| 2,363,592 | 11/1944 | Hunter | 285—260 X |
| 2,520,575 | 8/1950 | Smith | 285—8 |
| 2,582,249 | 1/1952 | Hendel. | |
| 2,984,503 | 4/1961 | Cunningham | 285—260 |
| 3,009,470 | 11/1961 | Zurek | 285—9 X |
| 3,115,352 | 12/1963 | Heerlein | 285—9 |
| 3,151,695 | 10/1964 | Mintz | 180—51 |
| 3,151,894 | 10/1964 | Wilson | 285—158 |

FOREIGN PATENTS

| | | |
|---|---|---|
| 1,223,800 | 6/1960 | France. |
| 671,280 | 12/1929 | France. |
| 860,906 | 2/1961 | Great Britain. |
| 521,613 | 3/1955 | Italy. |

CARL W. TOMLIN, *Primary Examiner.*

EDWARD C. ALLEN, *Examiner.*

T. A. LISLE, *Assistant Examiner.*